US008923507B2

(12) United States Patent
Chang et al.

(10) Patent No.: US 8,923,507 B2
(45) Date of Patent: Dec. 30, 2014

(54) ALPHA CHARACTER SUPPORT AND TRANSLATION IN DIALER

(75) Inventors: Li-Kai K. Chang, Redmond, WA (US); Genevieve Gambardella, Redmond, WA (US); Timothy L. Bui, Bothell, WA (US); Jason S. Hamilton, Kirkland, WA (US); Navneet Mehta, Bellevue, WA (US); Robert P. St. Pierre, Redmond, WA (US); Kelly Ann Grantham Gachet, Redmond, WA (US); Anil Dhawan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2167 days.

(21) Appl. No.: 11/765,615

(22) Filed: Jun. 20, 2007

(65) Prior Publication Data
US 2008/0317240 A1 Dec. 25, 2008

(51) Int. Cl.
*H04M 1/00* (2006.01)
*H04M 1/2745* (2006.01)
*H04M 1/56* (2006.01)
*H04M 1/725* (2006.01)

(52) U.S. Cl.
CPC .......... *H04M 1/274558* (2013.01); *H04M 1/56* (2013.01); *H04M 1/72522* (2013.01)
USPC ...................... 379/368; 379/93.15

(58) Field of Classification Search
CPC .................. H04M 1/27455; H04M 1/274558; H04M 1/56; H04M 1/72522; H04M 2250/22; H04M 15/55; H04M 1/57; H04M 2201/38; H04M 3/42059; H04M 3/42229; H04M 3/42042
USPC ................... 455/466, 412.1, 414.1; 379/368, 379/88.01–88.22, 93.15–93.18, 379/93.23–93.27, 100.13, 100.14, 100.15, 379/142.14, 207.13–207.15, 281, 289, 339, 379/340, 345, 353, 354–355.1
See application file for complete search history.

(56) References Cited

U.S. PATENT DOCUMENTS

| 5,812,657 | A | 9/1998 | Reding et al. |
| 6,243,460 | B1 | 6/2001 | Bhagavatula |
| 6,870,927 | B1 * | 3/2005 | Theis ........................ 379/355.01 |
| 6,963,638 | B1 * | 11/2005 | Keller ........................... 379/229 |

(Continued)

FOREIGN PATENT DOCUMENTS

WO    WO0139471 A2    5/2001

OTHER PUBLICATIONS

Bruce Meyerson. Fastap Keyboard. Oct. 26, 2006. http://www.theglobeandmail.com/servlet/story/RTGAM.20061026.gttap26/BNStory/Technology/home.

(Continued)

*Primary Examiner* — Akelaw Teshale
(74) *Attorney, Agent, or Firm* — Bryan Webster; Kate Drakos; Micky Minhas

(57) ABSTRACT

The innovation supports the ability to map alpha characters entered directly into the dialer application of a smartphone. These alpha characters can be entered via a smartphone keyboard (e.g., QWERTY keyboard) and converted to the appropriate digits as mapped to a conventional telephone keypad. The resultant numerical digits can be used to prompt a network call. Additionally, the innovation can be used during an active call to respond to prompts that traditionally require 12-key mappings. This innovation allows a user to both dial a number directly via a smartphone keyboard, and filter contacts by name, in a non-modal manner.

19 Claims, 11 Drawing Sheets

(56) References Cited

U.S. PATENT DOCUMENTS

| | | |
|---|---|---|
| 7,007,239 B1 | 2/2006 | Hawkins et al. |
| 2003/0007608 A1 | 1/2003 | Buntschuh et al. |
| 2003/0073414 A1 | 4/2003 | Capps |
| 2004/0198244 A1* | 10/2004 | Jarrad et al. ............... 455/90.1 |
| 2004/0203954 A1* | 10/2004 | Mikan et al. ................ 455/466 |
| 2005/0125230 A1 | 6/2005 | Haas |
| 2005/0244208 A1 | 11/2005 | Suess |
| 2006/0103623 A1* | 5/2006 | Davis ........................... 345/156 |
| 2007/0286398 A1* | 12/2007 | Ramamoorthy et al. 379/355.02 |

OTHER PUBLICATIONS

Bluetooth PC Dialer 2.0. http://www.freedownloadscenter.com/Network_and_Internet/Misc_Communications_Tools/Bluetooth_PC_Dialer.html. Last accessed Feb. 14, 2007.

* cited by examiner

ALPHA CHARACTER SUPPORT AND TRANSLATION IN DIALER

BACKGROUND

With the ever-increasing popularity of personal mobile devices, e.g., cell phones, smartphones, personal digital assistants (PDAs), personal music players, laptops, etc., 'mobility' has been the focus of many consumer products as well as services offered by wireless providers. In the telecommunications industry, 'mobility' is at the forefront as consumers are no longer restricted by location with regard to communications and computing needs. Rather, today, as technology advances, more and more consumers use portable devices in day-to-day communications, activities, planning and entertainment. In fact, studies have shown that many people today are opting for mobile phones and smartphones in place of traditional land lines.

As mobile device popularity increases, the ability to make telephone calls, access electronic mail, communicate via instant message (IM) and access aggregated online services such as a calendar appointments and tasks from any location has also continued to evolve. Many mobile devices such as cell phones, smartphones, PDAs or the like enable wireless synchronization with servers, for example mail servers. Accordingly, electronic messages can be sent and/or received via mobile devices by way of wireless synchronization.

In order to accommodate textual input, many mobile devices are equipped with a conventional QWERTY keyboard. The QWERTY keyboard derives its name from the first six letters on the keyboards top row of alpha characters. Although the QWERTY keyboard is the most common modern-day keyboard layout on typewriter and computer keyboards, the layout of the keys does not always translate to mobile applications.

For example, a standard telephone keypad designates specific letters to numeric digits on the touch-tone pad. For example, the letters 'A', 'B' and 'C' are commonly associated with the number 2. Similarly, letters 'E', 'F' and 'G' are commonly associated with the number 3, and so on. When a QWERTY keyboard is used, it is not possible for a user to dial telephone numbers which include letters or words. Similarly, it is not possible to reply to option commands by depressing the corresponding letter, for example, 'enter the first three letters of the last name of the person you are trying to reach.'

Today, vanity telephone numbers (e.g., 555-HELP) and command interactions are becoming more and more prevalent. However, unfortunately, today's QWERTY equipped devices are not able to communicate in this manner. In other words, the QWERTY keyboard is not conventionally configured with correct mappings to easily translate letters to numbers and vice versa.

Mobile smartphone devices with QWERTY keypads do not have the standard alpha characters on the numeric keys for a variety of reasons. One of these reasons is that the keys are often too small and this would confuse the user with regards to regular alpha entry. Therefore, the user would have to know the translation for phone numbers that employ alpha characters (e.g., 1-800-FLOWERS=18003569377) or refer to a conventional phone keypad to make the translation. This is very cumbersome to the user and therefore reduces the effectiveness of vanity numbers.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Vanity numbers such as 1-800-FLOWERS are easy to remember and easy to dial on standard 12-key keypads with number-letter mappings, but they pose a problem for 30-key (e.g., QWERTY keyboard) smartphones where the standard "2" to "abc" mappings are not displayed. The innovation supports the ability to enter alpha or alpha-numeric characters in the dialer application and to convert the alpha characters to the appropriate digits as mapped to a conventional telephone keypad (or other desired mapping).

The innovation disclosed and claimed herein, in one aspect thereof, comprises systems and methods that facilitate conversion of alpha and/or alpha-numeric inputs using a mobile device with a standard keyboard. In one aspect, QWERTY keyboard inputs can be mapped to traditional 12-key telephone touchpad digits in order to convert alpha characters to numerical values. These converted values can be used to trigger a network call or alternatively, can be used to when on an active call, e.g., to respond to automated prompts.

In other aspects, the innovation enables vanity numbers to be saved into an address book or caller log with minimal user action. For example, once a vanity number is converted in accordance with a defined mapping, a new contact entry can be automatically populated with the vanity number in the last name or company name field. Likewise, the numerical equivalent can be automatically populated within the office or home phone fields. Thus, a user can easily add this entry to the address book by selecting 'save' or 'store' to prompt the retention of the information.

In yet another aspect thereof, an artificial intelligence or machine learning & reasoning component is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
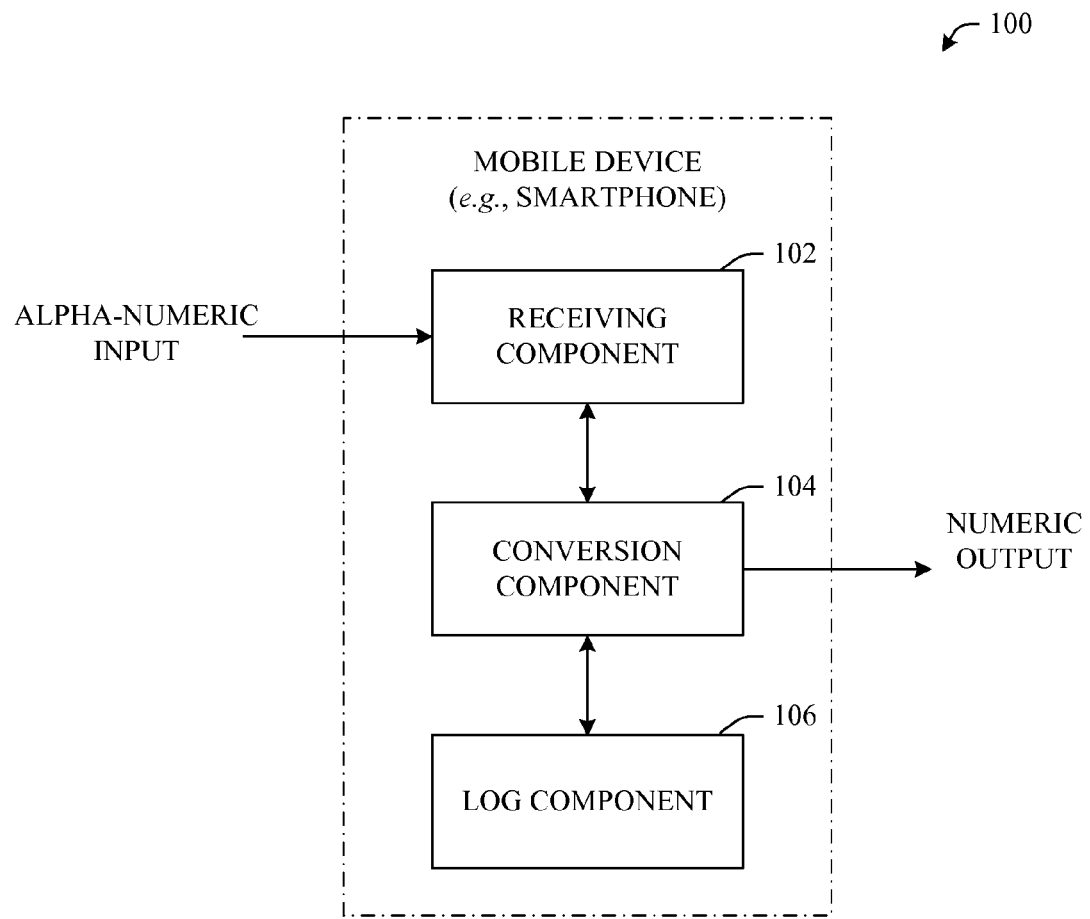
FIG. 1 illustrates an example system that facilitates conversion of alpha characters in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates a system 100 that enables alpha dialing using a standard keyboard. For example, the system 100 enables alpha dialing by way of a standard QWERTY keyboard on a smartphone. While many examples described herein are directed to the QWERTY keyboard, it is to be understood and appreciated that other mechanisms and types of keyboards can be used in alternative aspects. These alternative aspects are to be included within the scope of the innovation and claims appended hereto.

Generally, system 100 can include a receiving component 102, a conversion component 104 and a log component 106, together which enable recognition and/or conversion of an alpha-numeric (or solely alpha) input to a pure numeric output. This numeric output can be used to place a call, for example from a vanity number such as 1-800-555-JAMM. Similarly, the conversion or translation capabilities enable a user to employ mechanisms such as a QWERTY keyboard to respond to automated questions, for example "enter the first three letters of the person you would like to reach." These and other examples will be described in greater detail below.

As popularity of alpha dialing continues to grow, more and more people would benefit from this conversion functionality on their current mobile device, e.g., smartphone, personal digital assistant (PDA), etc. Unfortunately, because many of these devices are multi-modal devices, they are equipped with full function keyboards (e.g., QWERTY keyboards) rather than the standard touch pad layout of a conventional telephone. For at least this reason, vanity dialing is sometimes difficult as users are unaware of the traditional mappings of letters to numbers in order to translate the 'vanity' number to a functional telephone number.

The receiving component 102 enables a user to toggle between 'numbers mode' and 'alpha mode' in the dialer by pressing the keyboard mode change key (e.g., the function 'FN' key). When dialing numbers like '1-800-555-JAMM', a user would dial '1800555' using 'numbers mode' and then toggle to switch into 'alpha mode'. Once in 'alpha mode', the user can depress the keys matching the letters "J A M M" and push 'Talk' or 'Send' to dial the numerical equivalent of the vanity number.

In operation, the conversion component 104 can be employed to map each of the alpha characters to corresponding numeric digits. Continuing with the example, the conversion component 104 can map "J A M M" to "5 2 6 6" thereby triggering a call to 1-800-555-5266. This conversion is seamless to the user as conversion tables can be employed behind-the-scenes to effectuate the transformation.

As well be described below, the vanity number as well as the numerical equivalent can be rendered or displayed to the user via the device display. Additionally, the log component 106 can be employed to store the vanity number together with its numerical equivalent. For instance, the vanity number can be automatically placed into a last name, company or other desired field whereas the numerical equivalent will be placed into an appropriate contact number field. The user can be prompted to save this pair or alternatively, the device can be set to default either to save or not save as desired.

In another example, a user can also input DTMF (dual tone multi-frequency) tones using the same mechanism (e.g., QWERTY keyboard) while on an active call. As mentioned above, this alternative example enables users to respond to questions that require knowledge of traditional dial mappings (e.g., '2' translates to 'A', 'B' or 'C'), e.g., "enter the first three letters of the last name of the person you are trying to reach".

The conventional letter/DTMF translation is shown in the table below. In other words, a default translation of the alpha characters to DTMF tones can match the following table:

| LETTERS | DTMF NUMBER |
|---------|-------------|
| A B C   | 2           |
| D E F   | 3           |
| G H I   | 4           |
| J K L   | 5           |
| M N O   | 6           |
| P Q R S | 7           |
| T U V   | 8           |
| W X Y Z | 9           |

Without the features, functions, and benefits of the conversion component 104, there is no easy way to dial such vanity numbers on QWERTY keyboard devices. Rather, users would have to remember the corresponding mappings between letters and digits.

Figure 2A:
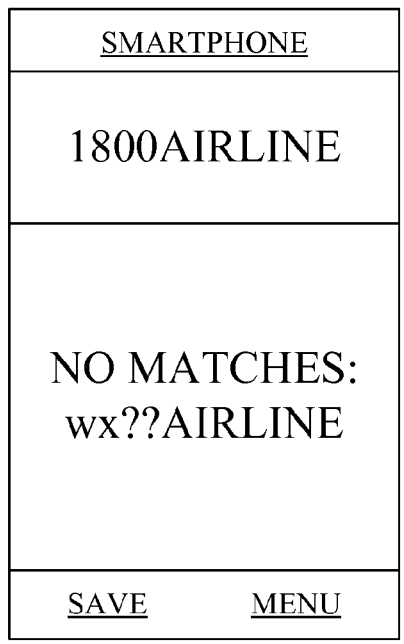
FIG. 2A illustrates an example screen shot of a system that demonstrates incorrect conversion without the mapping capabilities of the innovation.
Figure 2B:
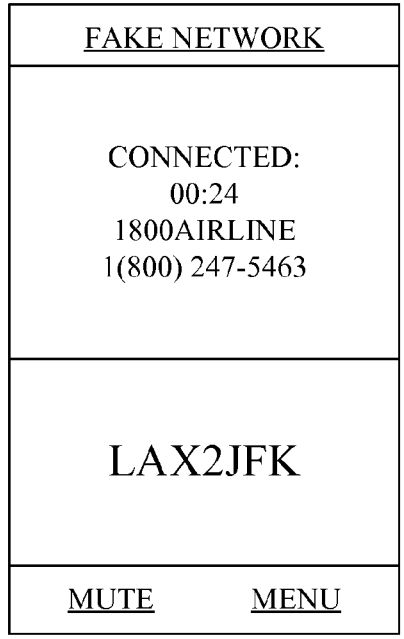
FIG. 2B illustrates an example screen shot of a system that demonstrates a correct conversion of a vanity number in accordance with an aspect of the innovation.

It is to be understood that this problem is most often specific to keyboarded devices, such as smartphones and communication equipped PDAs. On the traditional 12-key layout, the characters that correspond to each digit are printed on the keypad itself. Thus, the customer can easily find the appropriate keys to press for dialing such numbers. FIGS. 2A and 2B illustrate example screen shots in accordance with aspects of the innovation. While the examples in FIGS. 2A and 2B are provided merely to add perspective to the innovation, it is to be understood and appreciated that additional examples exist that would benefit from the features and functions of the innovation.

Turning first to FIG. 2A, an example of attempting to call '1-800-AIRLINE' on a traditional QWERTY-equipped device is shown. As can be seen, with the device in 'ABC' or alpha mode, no matches are found when the corresponding keys are depressed. Rather, attempting to enter '1-800-AIRLINE' yields the literal QWERTY equivalent 'wx??AIRLINE'. Accordingly, no matches are found.

As used herein, 'ABC' mode refers to a mode in the keyboard driver of a mobile device that interprets the primary character mapping for a key. On many smartphones, the ABC mode refers mainly to the alphabetic, or larger symbols. 'ALT' mode refers to a mode in the keyboard driver that interprets the alternate character mapping for a key. Accordingly, on many smartphones, the ALT mode accesses the numeric/symbolic, or smaller symbols.

FIG. 2B illustrates an example of the functionality of the conversion component (104 of FIG. 1). In particular, as a user dials '1-800-AIRLINE', the display can render the numeric equivalent in accordance with a traditional DTMF mapping, e.g., 1-800-247-5463. Here the user can trigger the call simply by depressing 'send' or 'enter' on the phone keypad.

In aspects, the system 100 of FIG. 1 can enable alpha dialing by enabling three sets of changes. First, the registry can be updated to enable alpha dialing. As will be described in more detail infra, in one embodiment, the following 2 registry keys can be set to enable the alpha dialing feature:

```
HKEY_LOCAL_MACHINE\Security\Phone\
    AlphaDialingEnabled = 1 [DWORD]
    DefaultInputMode = 7 [DWORD] (optional)
```

Next, keyboard mapping changes can be employed to support alpha dialing. Here, the conversion component (104 of FIG. 1) can employ keyboard mappings so that letters match when digits are input, and vice-versa. For example, the following mappings may be used on 'standard' device:

```
[HKEY_LOCAL_MACHINE\Security\Phone\
PhoneKeyMatch\KeyboardMapping]
    "31"="77"      ;1=w
    "32"="65"      ;2=e
    "33"="72"      ;3=r
    "34"="73"      ;4=s
    "35"="64"      ;5=d
    "36"="66"      ;6=f
    "37"="78"      ;7=x
    "38"="63"      ;8=c
    "39"="76"      ;9=v
    "23"="61"      ;#=a
    "2a"="7a"      ;*=z
    "0" = "451"           ;Unmap Cyrillic letter Io
    "74" = "74,2b"        ;allow insertion of '+' for international
dialing
```

Additionally, keyboard driver changes may be employed to effectuate the ability to convert alpha dialing to standard DTMF tones. These and other features, functions and benefits will be described below with reference to the figures that follow.

It will be appreciated that 'vanity' numbers such as 1-800-FLOWERS are easy to remember and easy to dial on standard 12-key keypads with number-letter mappings. However, they pose a problem for 30-key (e.g., QWERTY keyboard) smartphones where the standard '2' to 'abc' mappings are not displayed on the keyboard. Rather, the number '2' shares a key with another letter or symbol (e.g., letter 'R'). This lack of uniformity causes a problem when dialing vanity numbers as well as when responding to prompts that require spelling words, which by the way are mapped to the standard keypads.

The innovation supports the ability to enter alpha characters in a device dialer application and have the alpha characters be converted to the appropriate digits as mapped to a conventional (e.g., 12 key) telephone keypad. In aspects, this innovation enables a user to both dial a number directly and filter contacts by name, in a non-modal manner.

Figure 3:
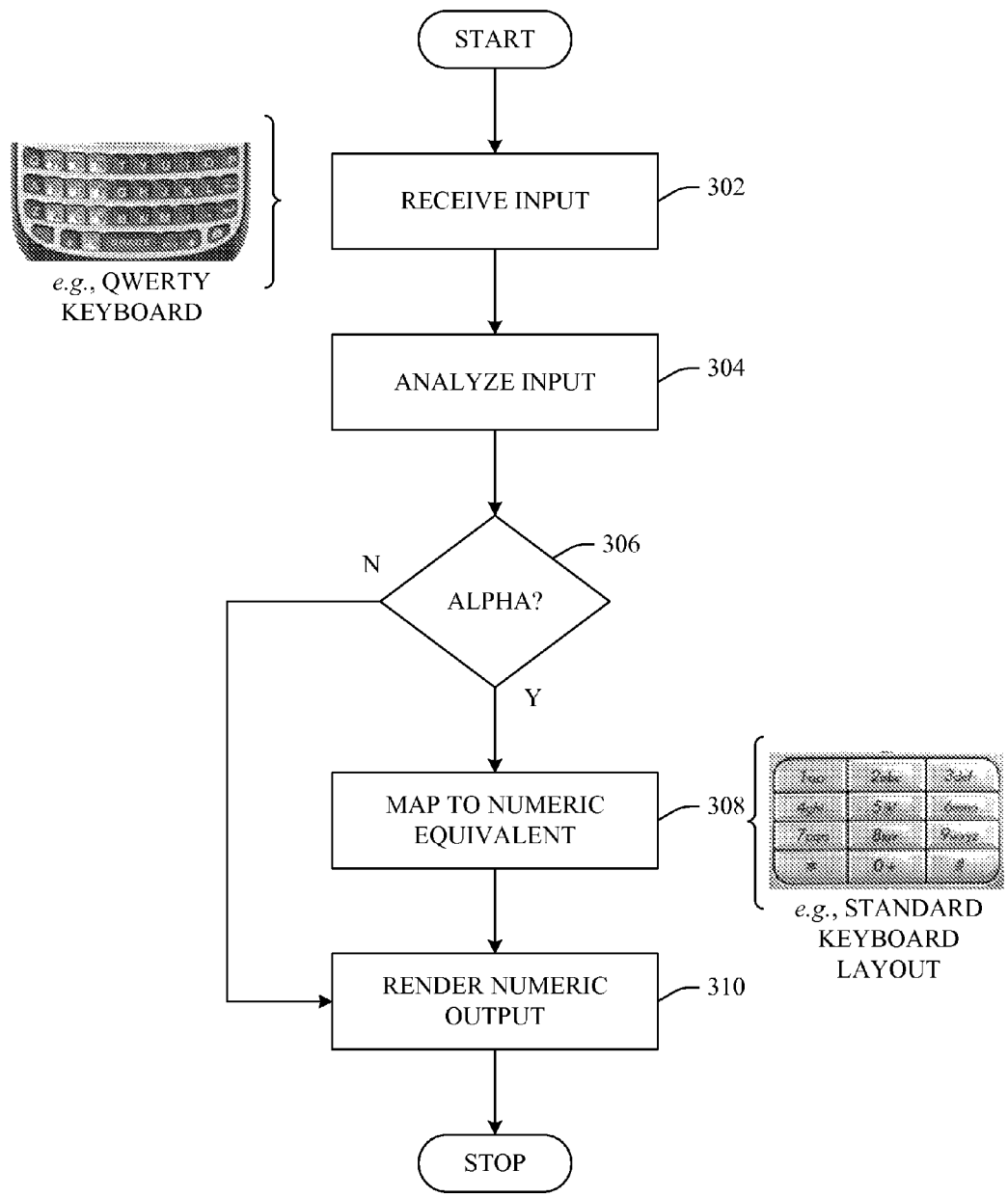
FIG. 3 illustrates an example flow chart of procedures that facilitate mapping of alpha characters in accordance with an aspect of the innovation.

FIG. 3 illustrates a methodology of mapping a QWERTY input to a conventional keypad in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 302 an alpha or alpha-numeric input is received. It is to be understood that this methodology is recursive for each digit of an input. In other aspects, the innovation can receive an input string, for example from a website or other source, and thereafter translate the characters and/or digits as appropriate. These alternative aspects are to be included within the scope of the innovation and claims appended hereto.

At 304, the input can be analyzed and a determination can be made if the input is an alpha character or a numeric digit.

As will be understood, most devices enable a user to toggle between alpha and numerical input. For instance, when a user dials a number such as, 1-800-555-JAMM, they would first dial the '1800555' string in numerical input mode (e.g., 'ALT') finishing with 'JAMM' in alpha input mode (e.g., 'ABC'). Here, at 306, a determination can be made if the entry is numerical or alphabetic.

If the entry is an alpha character (e.g., letter), at 308, this entry can be mapped to the numerical equivalent as a function of a standard keyboard layout. Although this example employs a standard 12-key layout to map alpha characters to numerical equivalents, it is to be understood that most any mapping or conversion table can be employed without departing from the spirit and/or scope of the innovation. Similarly, machine learning and/or reasoning (MLR) techniques can be employed to determine or infer a desired mapping. This can be especially useful in instances where a user misspells a vanity input or frequently dials a vanity input. In each of these example scenarios, the MLR mechanisms can enhance response and processing speed in effectuating the conversion by inferring an intention of a user.

Once the numeric equivalent is determined, or if not alpha at 306, the output can be rendered at 310. For instance, here the conversion can be displayed to a user as each digit/character is entered. Additionally, the output can be rendered to a log where the number can be stored in a 'call history' or 'address book' for later recovery as desired.

Smartphone and other mobility users are accustomed to the ability to start typing the names of the contacts they stored within the address book of their device. In accordance with this trend, the innovation integrates vanity dialing (e.g., 1-800-555-JAMM) into this user scenario as to seamlessly integrate the vanity dialing experience into the smart filter functionality of a smartphone or other mobile device. Phone users can dial the vanity number and filter on their contacts and call history without any modal switching or forethought.

As described with reference to FIG. 3, as the vanity number accumulates into the call history list, the user can have the option of saving these numbers into the contacts database. The experience allows the user to save the vanity number as a last name (or other field) and the converted numeric phone number as the phone record in their contacts, further integrating the new functionality into their existing user experience and expectations.

Moreover, while on an active call, in response to automated system prompts, users have the ability to spell out names on their mobile device using their QWERTY keyboard. Additionally, the innovation can support accented characters (e.g., a-umlaut maps to 'a', example café). Adaptive formatting which formats alpha numbers differently from normal phone numbers is also supported. Still further, the innovation enables user-customizable features upon rendering (e.g., 'no-matches' text) conversions. As described above, the call history can actually maintain the actual alpha string of the vanity number, which makes the entry more recognizable to a user rather than merely the converted numerical output. These and other aspects will be described in more detail with reference to the figures that follow infra.

The following usage scenarios and walkthroughs are provided to add perspective to the innovation. It is to be understood that these scenarios and walkthroughs are not intended to limit the scope of the innovation in any way. Rather, they are provided to add context to some of the features, functions and benefits of the innovation.

A first usage scenario is directed to vanity or alpha dialing from the dialer application of a mobile device. Here, Jill sees a commercial for 1-800-FLOWERS and decides to order flowers for her mother on Mother's Day. She enters '1800', then switches the keyboard to 'abc' mode (input mode is displayed). She enters 'FLOWERS', and then presses 'Send'. Both '1800FLOWERS' and '18003569377' are displayed in the Calling screen, but '18003569377' is actually output to the network to trigger the call. Jill places her order and ends the call.

A second usage scenario is directed to dialing alpha characters while on an active call. After talking to the 'Nice ABC Cable Guys', Jill is heading to the airport to fly home to Detroit when she hears that there is bad weather in the Motor City on the radio. Instead of wasting time driving to the airport to see if her flight is delayed, she calls the automated airport service telephone number. She is greeted on the phone by an automated phone system that asks her to input the first 3 letters of her destination city. She switches her smartphone keyboard to 'abc' mode and enters 'DET' for Detroit. The automated system confirms for her that in fact her flight is delayed by 3 hours.

A third scenario is directed to saving an alpha (or vanity) number from the call history within a smartphone device. In this scenario, Jill places the call back to the cable company and decides that she really enjoyed talking to the wonderful customer service representatives. She goes to her call history within her device, and sees the last dialed call as 1-800-ABCCABLE. She presses the 'Save' button, which brings up a new contact form. '1800ABCCABLE' is already chosen as the last name (and/or company name). She scrolls down to the home phone (or work phone) entry field and sees that the translated number (1-800-222-2253) is present. She presses the 'Done' button, and her '1800ABCCABLE' contact is now saved for future dialing.

Turning now to the sample technical walkthroughs of FIGS. 4 and 5, the table below setsforth an example key mapping. These key mappings are used within the sample walkthroughs.

| Key/Character | Mapping |
| --- | --- |
| 6 | F, 6 |
| @ | L, @ |
| 4 | S, 4 |
| ) | Y, ) |
| & | O, & |
| - | U, - |
| 0 | O, ? |
| \ | B |

Similarly, the user has the following contacts in the device contacts list:

| Name (Last, First) | Work Phone |
| --- | --- |
| Smith, John | 18005551212 |
| Johnson, Frank | 234-2345 |

Figure 4:
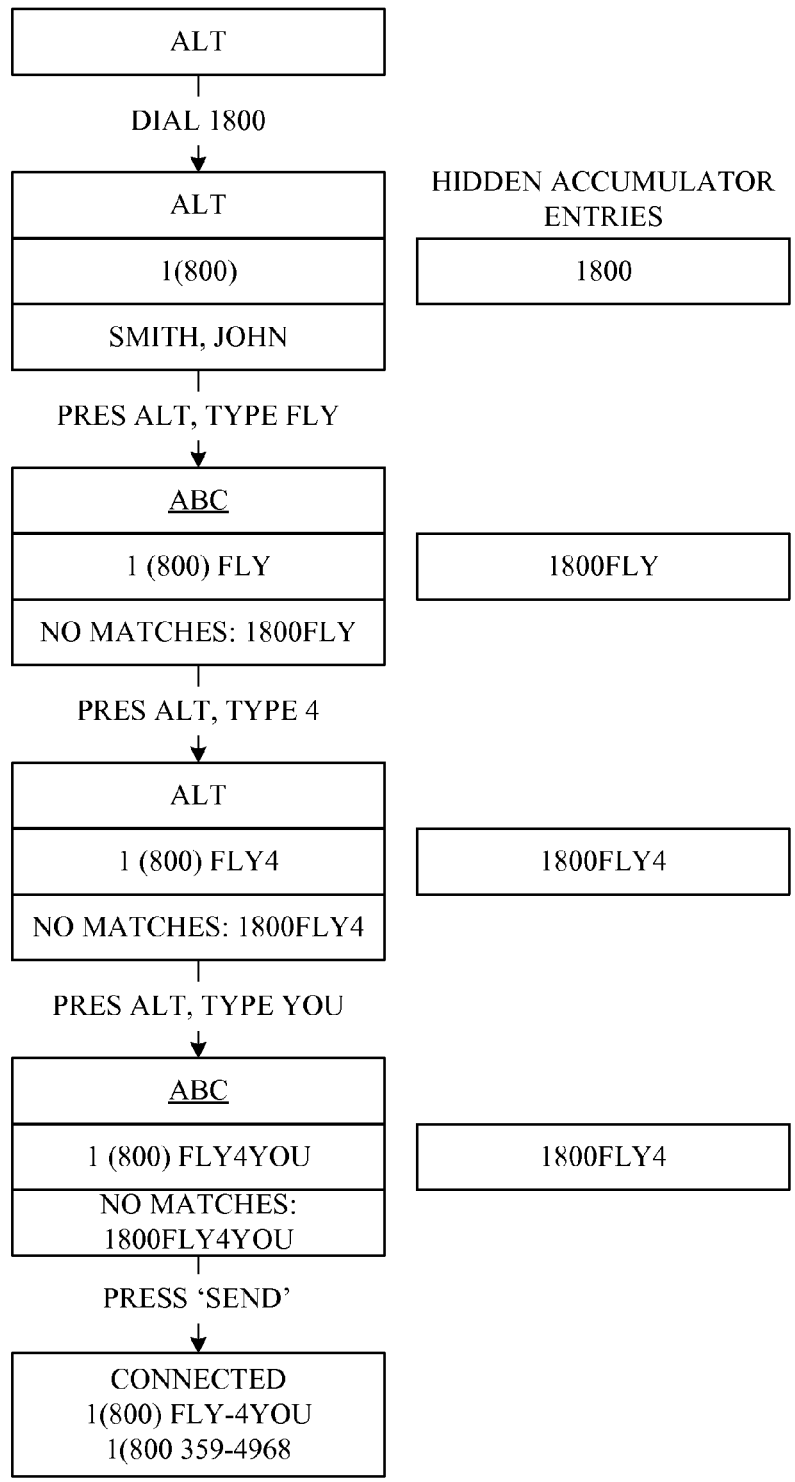
FIG. 4 illustrates an example walkthrough of entering a vanity number in accordance with an aspect of the innovation.

In the first example walkthrough of FIG. 4, a user wants to dial the vanity number, 1 (800) FLY4YOU using a QWERTY keyboard of a smartphone device. In the second scenario, a user wants to call Frank Johnson by entering his first name into the dialer.

With reference to FIG. 4, 'ALT' refers to 'alternate' mode which, on most smartphone devices enables selection of the alternate number or character on a particular key. This 'ALT' functionality can be accessed on disparate devices using a 'function' or other appropriate key. Similarly, 'ABC' mode can be selected to enter the alpha character shown on a particular key. It is to be understood that a user can toggle between or select an appropriate input mode (e.g., 'ALT' or 'ABC'). It will be appreciated that this selection enables a user to more easily enter vanity inputs.

The flow diagram of FIG. 4 illustrates keystrokes as well as lookup responses by the device. For example, when '1800' is dialed, the device returns 'SMITH, JOHN' as a possible match. Similarly, the hidden accumulator entry maintains '1800' for retrieval. Because 'SMITH, JOHN' is not the intended target, the user toggles to 'ABC' mode and enters 'FLY'. Here, no matches are found as indicated. The rest of the flow continues as shown until, ultimately, the complete vanity number is entered.

Once the number is entered, the user can press 'Send' which triggers a call via a network. As illustrated, both the vanity number as well as its numerical equivalent is shown on the display of the device.

Figure 5:
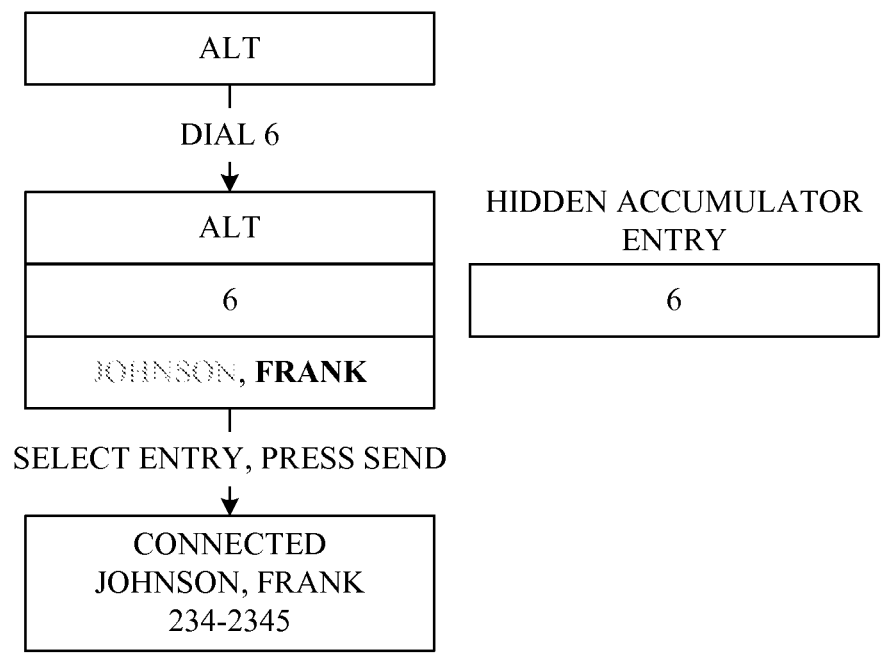
FIG. 5 illustrates an example walkthrough of employing the mapping characteristics of the innovation to search for a saved contact.

FIG. 5 illustrates a flow diagram of keystrokes to call Frank Johnson in accordance with an aspect of the innovation. Here, by dialing the number '6', the system automatically maps to the letter 'F' which, in turn, retrieves the entry for 'JOHNSON, FRANK'. Because this individual is the intended target, the user can depress 'Send' to trigger communication via the matching number in the address book, '234-2345'.

Figure 6:
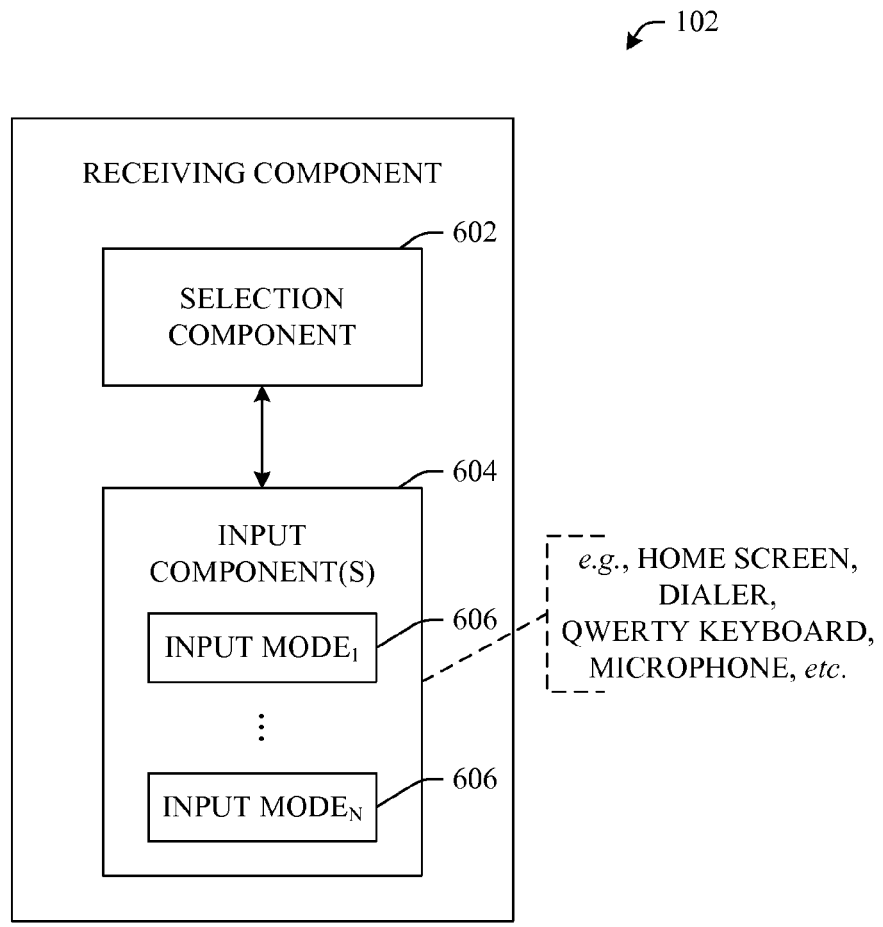
FIG. 6 illustrates an example block diagram of a receiving component in accordance with an aspect of the innovation.

FIG. 6 illustrates an example block diagram of a receiving component 102 that includes a selection component 602 and an input component 604, having 1 to N input modes 606 associated therewith, where N is an integer. While many of the examples described herein are directed to employing a QWERTY keyboard within the dialer application as an input mode 606, it is to be understood that other types of keyboard/keypad inputs as well as microphones can be employed without departing from the spirit and/or scope of the innovation.

Essentially, the selection component 602 can enable a user to select an input mode 606. Additionally, the selection component 602 can enable choices within a particular mode. For example, referring again to the example walkthroughs of FIGS. 4 and 5, here, the selection component 602 enables a user to select a QWERTY keyboard for input of the target information (e.g., vanity number). As well, the selection component 602 can be employed to toggle between the 'ALT' and "ABC" modes in order to effectively enter the correct input using the QWERTY keyboard which reflects multiple options on a key.

Figure 7:
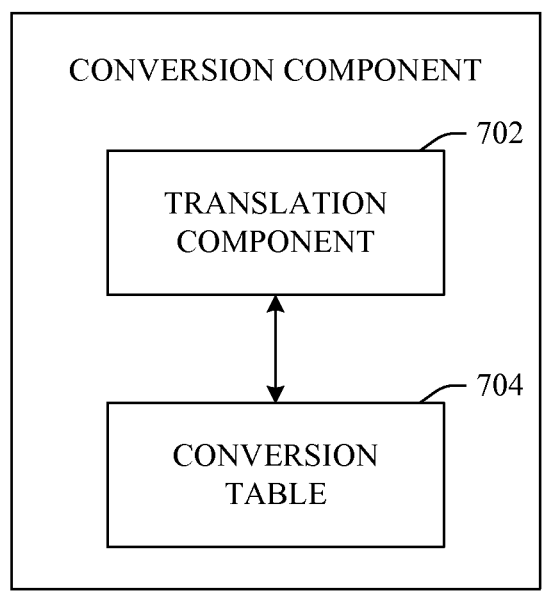
FIG. 7 illustrates an example block diagram of a conversion component in accordance with an aspect of the innovation.

Referring now to FIG. 7, an example block diagram of a conversion component 104 in accordance with an aspect of the innovation. Generally, conversion component 104 includes a translation component 702 and a conversion table 704. In operation, the translation component 702 receives an alpha, or alpha-numeric, input and employs the conversion table to translate the input into a numeric input. This translated numeric input can be used to trigger a call by way of a mobile network (e.g., cell network, voice-over-internet protocol (VoIP), opportunistic or mesh network). As well, the translated output can be used to generate DTMF tones in response to automated system challenges.

Figure 8:
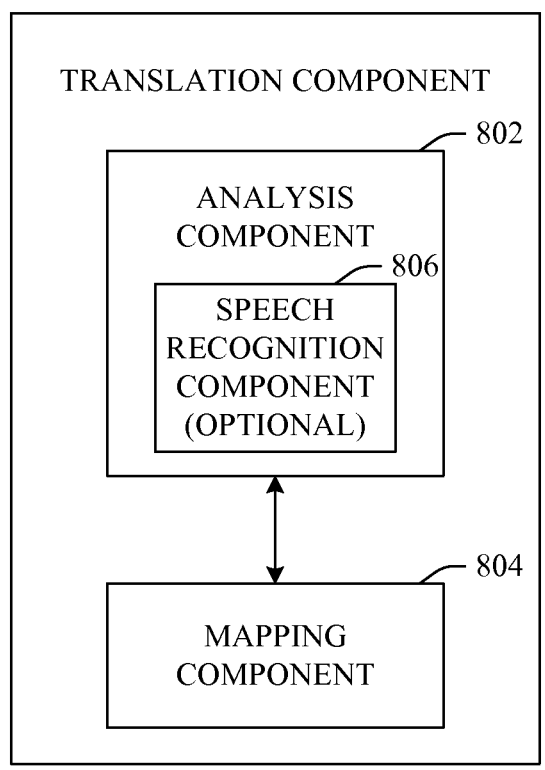
FIG. 8 illustrates an example block diagram of a translation component in accordance with an aspect of the innovation.

FIG. 8 illustrates an example block diagram of a translation component 702 in accordance with an aspect of the innovation. As shown, the example translation component 702 can include an analysis component 802 and a mapping component 804. In operation, the analysis component 802 can evaluate an input to determine if it is an alpha, alpha-numeric or solely numeric input. As described with reference to FIG. 3 supra, the analysis can evaluate each letter/digit as entered or alternatively, can analyze strings or characters, letters, numbers or combinations thereof.

Alternatively, the analysis component 802 can be equipped with speech recognition capabilities, e.g., speech recognition component 806. The component 806 can be employed to analyze spoken words, phrases and numbers which can be processed in the same manner consistent with the features, functions and benefits of the innovation.

Regardless of whether the input comprises alpha characters, alpha-numeric or spoken words, the analysis component 802 can employ the mapping component 804 to map the letters and characters to appropriate numerical values. As described above, this mapping can be based upon most any desired conversion table (e.g., conventional telephone dial or 12-key touchpad).

Figure 9:
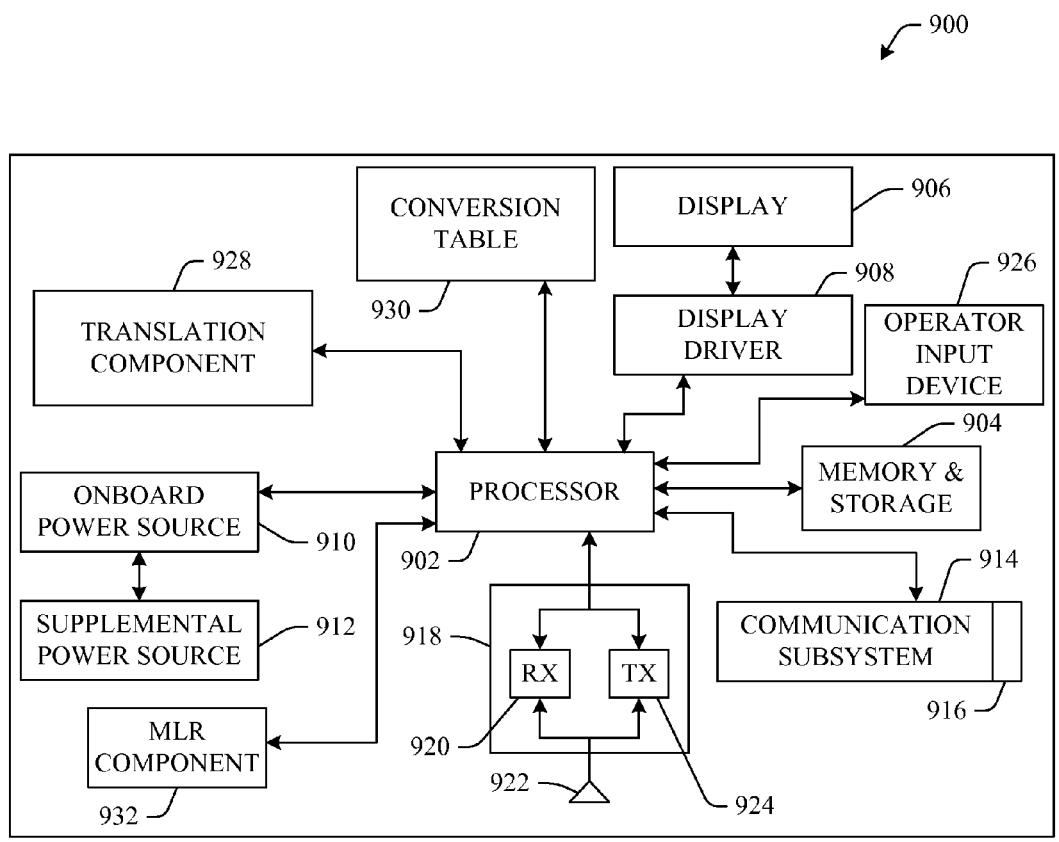
FIG. 9 illustrates an example block diagram of a portable device the employs the mapping functionality of the innovation together with machine learning and reasoning that can automate functionality in accordance with an aspect of the innovation.

Referring now to FIG. 9, there is illustrated a schematic block diagram of a portable device 900 according to one aspect of the subject innovation, in which a processor 902 is responsible for controlling the general operation of the device 900. It is to be understood that the portable device 900 can be representative of most any portable device including, but not limited to, a cell phone, smartphone, PDA, a personal music player, image capture device (e.g., camera), personal game station, etc.

The processor 902 can be programmed to control and operate the various components within the device 900 in order to carry out the various functions described herein. The processor 902 can be any of a plurality of suitable processors. The manner in which the processor 902 can be programmed to carry out the functions relating to the subject innovation will be readily apparent to those having ordinary skill in the art based on the description provided herein. As will be described in greater detail infra, an MLR component and/or a rules-based logic component can be used to effect an automatic action of processor 902.

A memory and storage component 904 connected to the processor 902 serves to store program code executed by the processor 902, and also serves as a storage means for storing information such as data, services, metadata, device states or the like. In aspects, this memory and storage component 904 can be employed in conjunction with other memory mechanisms that house data (e.g., contacts). As well, in other aspects, the memory and storage component 904 can be a stand-alone storage device or otherwise synchronized with a cloud or disparate network based storage means.

The memory 904 can be a non-volatile memory suitably adapted to store at least a complete set of the information that is acquired. Thus, the memory 904 can include a RAM or flash memory for high-speed access by the processor 902 and/or a mass storage memory, e.g., a micro drive capable of storing gigabytes of data that comprises text, images, audio, and video content. According to one aspect, the memory 904 has sufficient storage capacity to store multiple sets of information relating to disparate services, and the processor 902 could include a program for alternating or cycling between various sets of information corresponding to disparate services.

A display 906 can be coupled to the processor 902 via a display driver system 908. The display 906 can be a color liquid crystal display (LCD), plasma display, touch screen display or the like. In one example, the display 906 is a touch screen display. The display 906 functions to present data, graphics, or other information content. Additionally, the display 906 can display a variety of functions that control the execution of the device 900. For example, in a touch screen example, the display 906 can display touch selection buttons which can facilitate a user to interface more easily with the functionalities of the device 900.

Power can be provided to the processor 902 and other components forming the device 900 by an onboard power system 910 (e.g., a battery pack). In the event that the power system 910 fails or becomes disconnected from the device 900, a supplemental power source 912 can be employed to provide power to the processor 902 and to charge the onboard power system 910. The processor 902 of the device 900 can induce a sleep mode to reduce the current draw upon detection of an anticipated power failure.

The device 900 includes a communication subsystem 914 having a data communication port 916, which is employed to interface the processor 902 with a remote computer, server, service, or the like. The port 916 can include at least one of Universal Serial Bus (USB) and IEEE 1394 serial communications capabilities. Other technologies can also be included, but are not limited to, for example, infrared communication utilizing an infrared data port, Bluetooth™, etc.

The device 900 can also include a radio frequency (RF) transceiver section 918 in operative communication with the processor 902. The RF section 918 includes an RF receiver 920, which receives RF signals from a remote device via an antenna 922 and can demodulate the signal to obtain digital information modulated therein. The RF section 918 also includes an RF transmitter 924 for transmitting information (e.g., numerical output) to a remote device, for example, in response to manual alpha-numeric user input via a user input 926 (e.g., a keypad).

A translation component 928 is provided which, as described supra, can facilitate translation and/or conversion of alpha, alpha-numeric or other non-numerical input (e.g., voice). Additionally, a conversion table 930 can be employed to further facilitate translation of non-numerical inputs. It is to be appreciated that these components can enable functionality of like components (and sub-components) described supra.

Device 900 can also be equipped with an MLR component 932 which facilitates automating one or more features in accordance with the subject innovation. The subject innovation (e.g., in connection with determining numerical mapping/output) can employ various MLR-based schemes for carrying out various aspects thereof.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria how to map an input, how, when and where to save inputs/conversions, etc.

Figure 10:
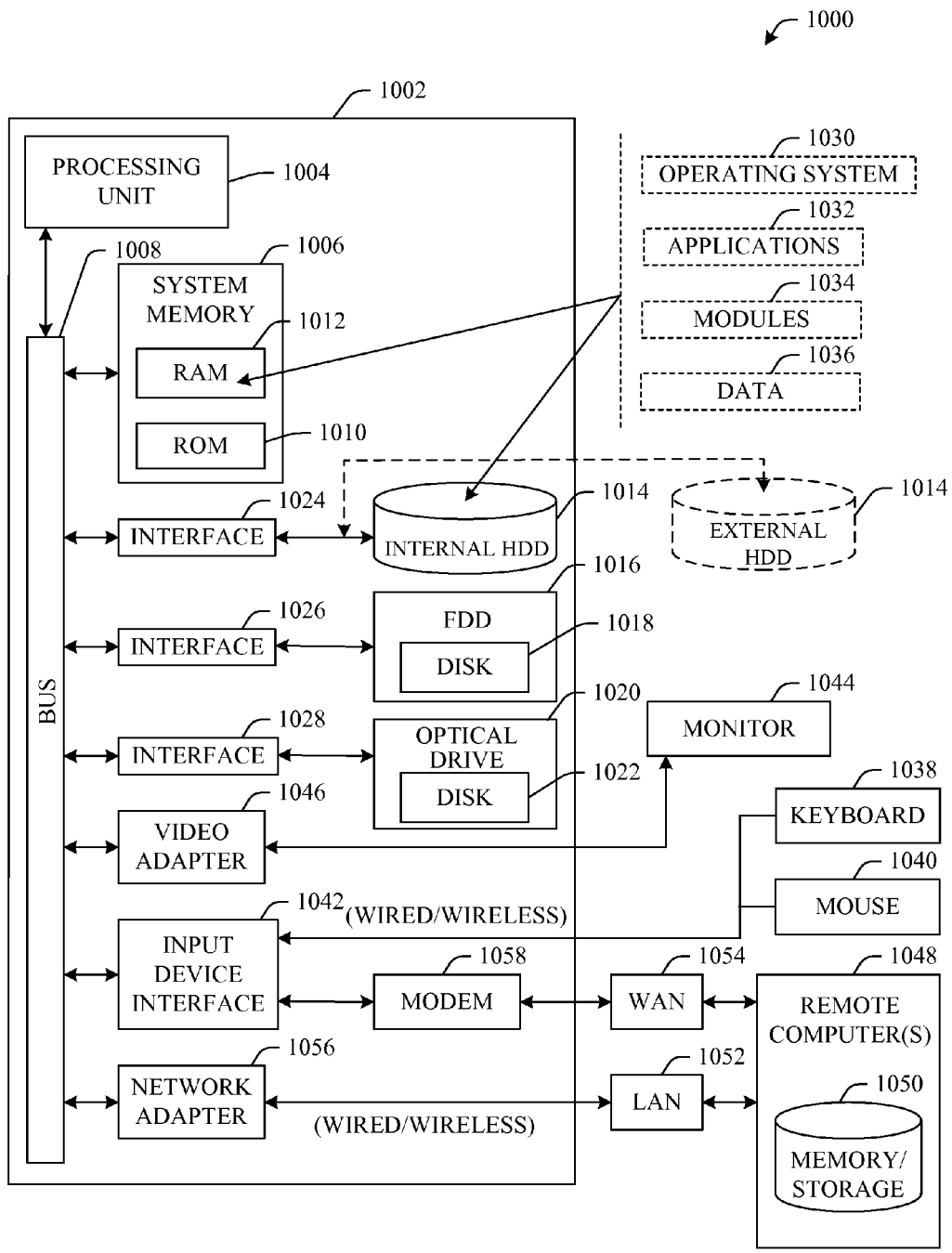
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5

GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
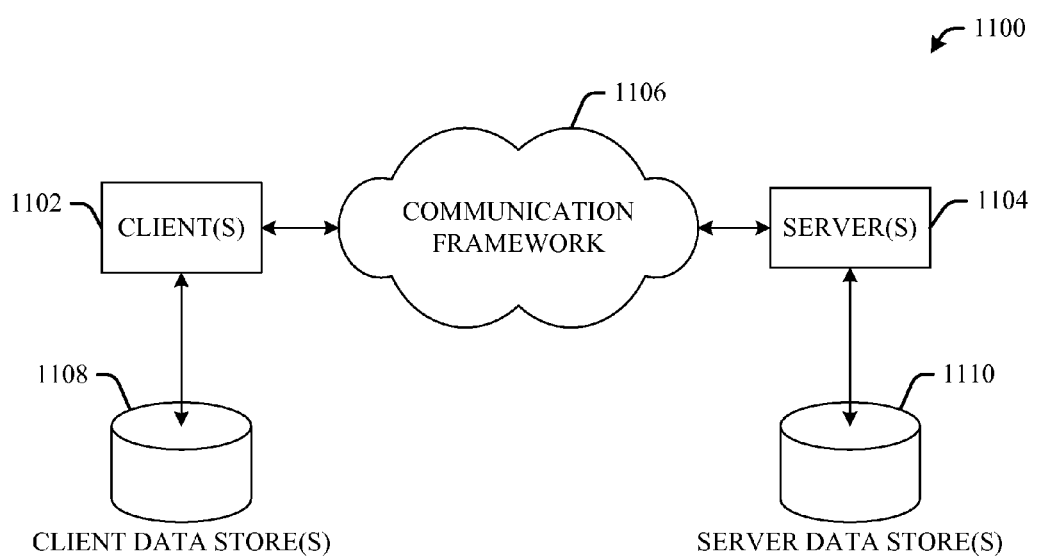
FIG. 11 illustrates a schematic block diagram of an exemplary computing environment in accordance with the subject innovation.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices). The client(s) 1102 can house cookie(s) and/or associated contextual information by employing the innovation, for example.

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates conversion of an alpha-numeric input into a smartphone, comprising:
    a receiving component that receives the alpha-numeric input;
    a conversion component that converts each character of the alpha-numeric input into a candidate numeric digit; and
    a machine learning and reasoning component that employs at least one of a probabilistic and a statistical-based analysis that infers an action that a user desires to be automatically performed, the machine learning and reasoning component configured to validate the candidate numeric digit if the candidate numeric digit will achieve the inferred action and configured to change the candidate numeric digit to an inferred numeric digit if the candidate numeric digit will not achieve the inferred action, wherein the numeric digit, as validated or changed, is employed to control operation of the smartphone.

2. The system of claim 1, further comprising a selection component that facilitates selection of an input modality that facilitates entry of the alpha-numeric input.

3. The system of claim 2, wherein the input modality is at least one of a home screen, a dialer, a QWERTY keyboard, or a microphone.

4. The system of claim 1, further comprising a translation component that employs a conversion table to transform each character of the alpha-numeric input into a candidate numeric digit.

5. The system of claim 1, further comprising an analysis component that evaluates each character of the alpha-numeric input and determines appropriate translation requirement based upon a predetermined relationship.

6. The system of claim 5, further comprising a speech recognition component that converts speech to text, wherein the alpha-numeric input includes a spoken word and the text identifies each character of the alpha-numeric input.

7. The system of claim 5, further comprising a mapping component that maps each character of the alpha-numeric input into a candidate numeric digit as a function of a conversion table.

8. A computer-implemented method of processing an alpha input using a mobile device, comprising:
    receiving the alpha input, wherein the alpha input includes a plurality of characters;
    mapping each character of the alpha input to a candidate numeric digit, wherein a machine learning and reasoning component employs at least one of a probabilistic and a statistical-based analysis that infers an action that a user desires to be automatically performed, the machine learning and reasoning component configured to validate the candidate numeric digit if the candidate numeric digit will achieve the inferred action and configured to change the candidate numeric digit to an inferred numeric digit if the candidate numeric digit will not achieve the inferred action; and
    employing each numeric digit, as validated or changed, to control operation of the mobile device.

9. The computer-implemented method of claim 8, further comprising rendering each numeric digit by way of a display on the mobile device.

10. The computer-implemented method of claim 8, further comprising populating a log with each of the alpha input and the numeric digit.

11. The computer-implemented method of claim 8, further comprising selecting at least one of a home screen, a dialer, a keyboard or a microphone to generate the alpha input.

12. The computer-implemented method of claim 8, wherein the act of mapping employs a conversion table that identifies a relationship between each character of the alpha input and the candidate numeric digit.

13. The computer-implemented method of claim 8, further comprising displaying the alpha input to a user upon mapping each character of the alpha input to a numeric digit.

14. The computer-implemented method of claim 8, further comprising phonetically analyzing the alpha input to determine the candidate numeric digit.

15. The computer-implemented method of claim 8, wherein the mobile device is one of a mobile phone, smartphone, personal digital assistant, or mobile media player.

16. A computer-executable system that facilitates processing an alpha-numeric smartphone input, comprising:
    means for receiving the alpha-numeric smartphone input, wherein the alpha-numeric smartphone input represents a 'vanity' telephone number;

means for converting each character of the alpha-numeric smartphone input into a candidate numeric digit, wherein a machine learning and reasoning component employs at least one of a probabilistic and a statistical-based analysis that infers an action that a user desires to be automatically performed, the machine learning and reasoning component configured to validate the candidate numeric digit if the candidate numeric digit will achieve the inferred action and configured to change the candidate numeric digit to an inferred numeric digit if the candidate numeric digit will not achieve the inferred action; and means for triggering a smartphone call based upon the validated or changed numeric digit.

17. The computer-executable system of claim 16, further comprising means for mapping each character of the alpha-numeric smartphone input into a candidate numeric digit, wherein the mapping employs a conversion table.

18. The computer-executable system of claim 16, further comprising means for inputting the alpha-numeric smartphone input, wherein the means for inputting is one of a home screen, a dialer, a QWERTY keyboard and a microphone.

19. The computer-executable system of claim 18, further comprising means for selecting the means for inputting the alpha-numeric smartphone input.

* * * * *